March 5, 1968  R. H. WISE  3,371,369
WINDSHIELD WIPER

Filed July 28, 1965  4 Sheets-Sheet 1

INVENTOR.
Ralph H. Wise,
BY
Trask, Jenkins & Hanley
ATTORNEYS.

March 5, 1968

R. H. WISE 3,371,369

WINDSHIELD WIPER

Filed July 28, 1965

INVENTOR.
Ralph H. Wise,
BY
Trask, Jenkins & Hanley
ATTORNEYS.

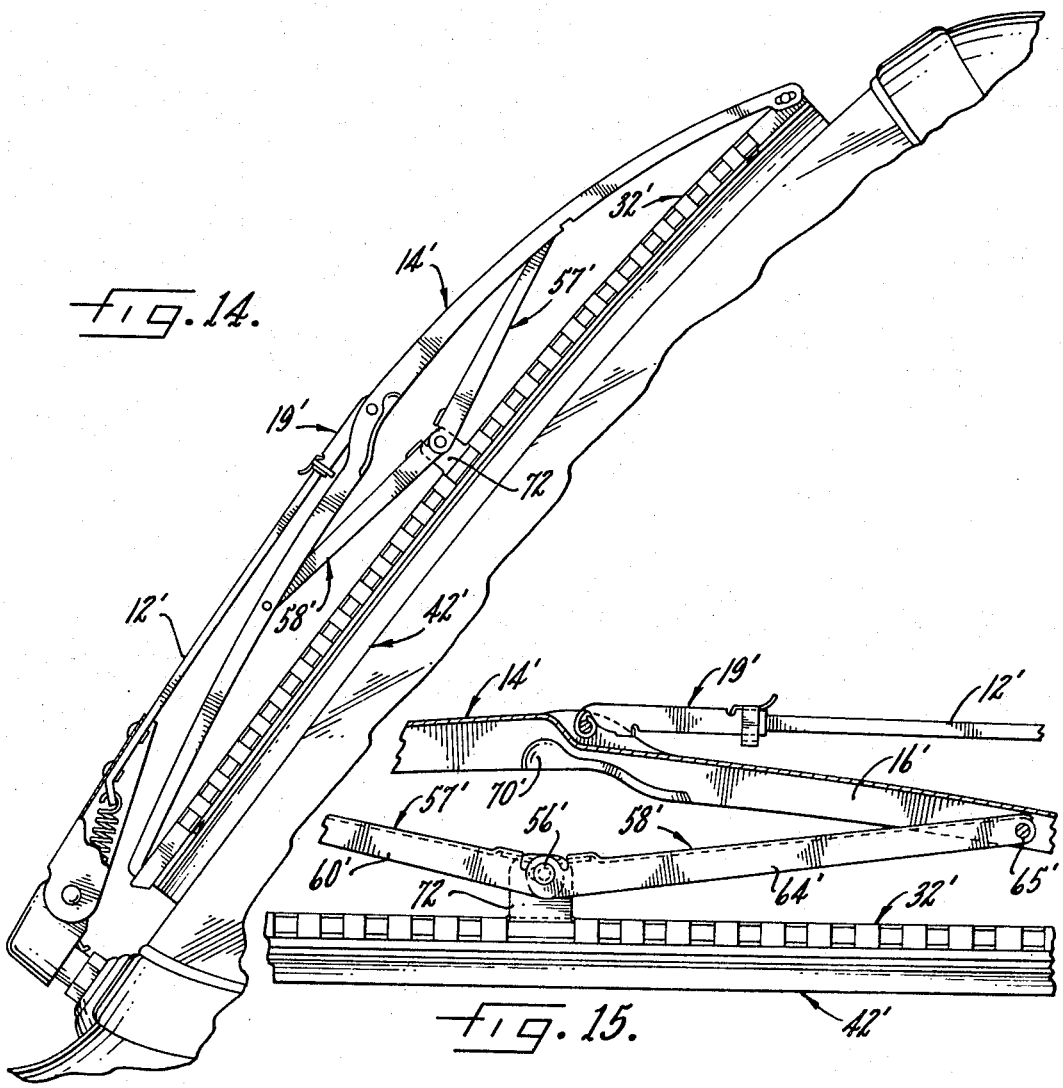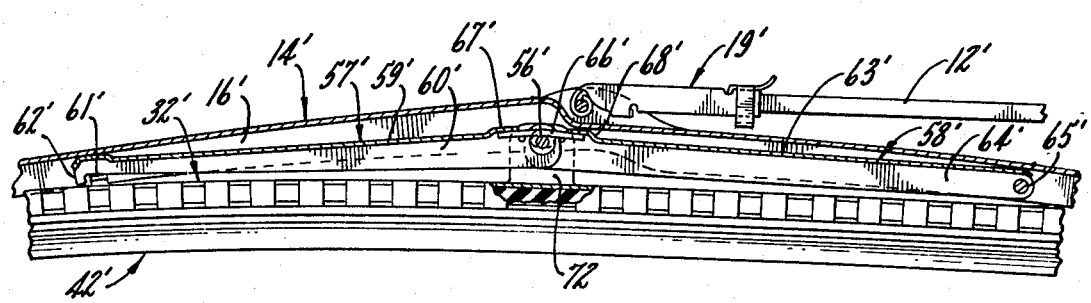

United States Patent Office 3,371,369
Patented Mar. 5, 1968

3,371,369
WINDSHIELD WIPER
Ralph H. Wise, c/o Arvin Industries, Inc.,
Columbus, Ind. 47201
Filed July 28, 1965, Ser. No. 475,447
16 Claims. (Cl. 15—250.42)

ABSTRACT OF THE DISCLOSURE

A windshield wiper assembly for wiping a curved surface comprising an elongated flexible wiper attached at its ends to a relative rigid elongated bow structure and link means carried intermediate the ends of the bow structure to apply pressure to the wiper intermediate its ends.

---

This invention relates to a windshield wiper assembly, and more particularly to a windshield wiper adapted to clean or wipe both curved and planar surfaces.

It is an object of the invention to provide a windshield wiper assembly which will clean or wipe both curved and planar surfaces, which will provide a controlled wiping pressure along its length, which can employ a replaceable squeegee element which can move into a compact retracted position, and which will be of attractive appearance yet prove sturdy and durable in use.

In accordance with one form of the invention, there is provided an elongated arcuate bow having a connector swingably mounted thereon and adapted to be connected to a wiper driving arm. The bow is connected at its ends to the ends of an elongated flexible holder which is relatively rigid transversely of its width but flexible transversely of its thickness so that it can conform to the curvature of the surface being wiped. An elongated flexible squeegee is mounted in the holder and projects outwardly therefrom to engage the surface to be wiped. Desirably, the squeegee is swingable with respect to the holder about an axis parallel to its longitudinal axis.

A load bar is connected to the holder at a pair of longitudinally spaced points intermediate the ends of said holder. A pair of links are swingably connected to each other and to said load bar at one of their ends. The links diverge from said holder and their opposite ends are swingably connected to the bow on a pair of longitudinally spaced axes, at least one of which is longitudinally movable. Biasing means act on said pair of links to cause them to urge the holder and squeegee outwardly from said bow to conform to the surface being wiped.

Other objects and features of the invention will become apparent from the more detailed description which follows and from the accompanying drawings in which:

FIG. 14 is a side elevation of a modified form of the wiper assembly shown in FIG. 1, and showing said assembly in combination with the convex surface of a windshield;

FIG. 15 is a fragmentary vertical section of the assembly shown in FIG. 16; and

FIG. 16 is a fragmentary vertical section similar to FIG. 15 but showing the assembly in a retracted nested position.

As shown, the instant invention is adapted to clean or wipe a planar or curved windshield 10. The assembly is connected to a conventional driving arm 12 for traversing it across the windshield and provided with a spring 13 for forcing the wiper assembly against said windshield.

Figures 1, 2:
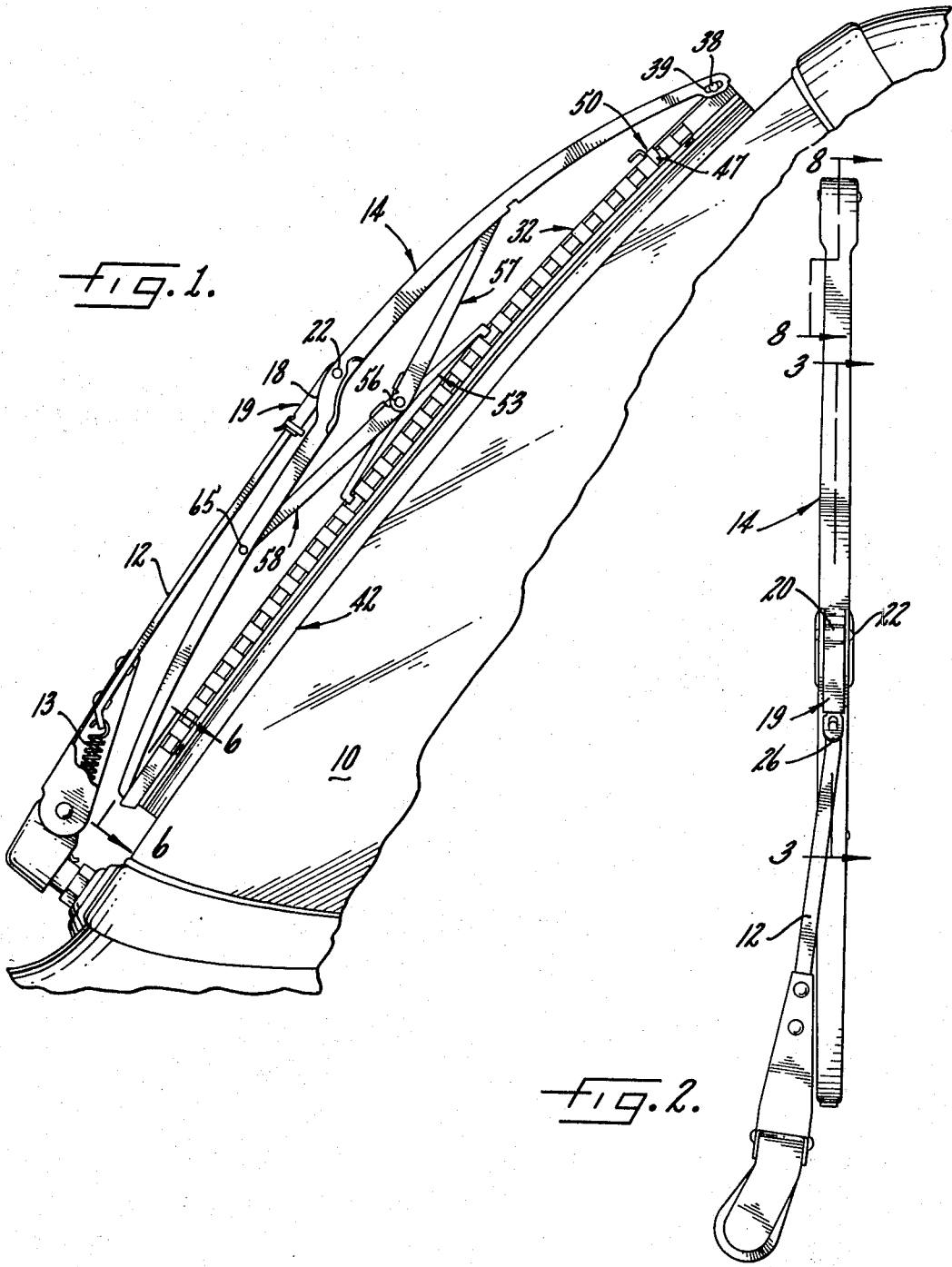
FIG. 1 is a side elevation of a windshield wiper assembly embodying the invention and shown in association with the convex surface of a windshield.
FIG. 2 is a top plan view of the wiper assembly shown in FIG. 1.
Figure 3:
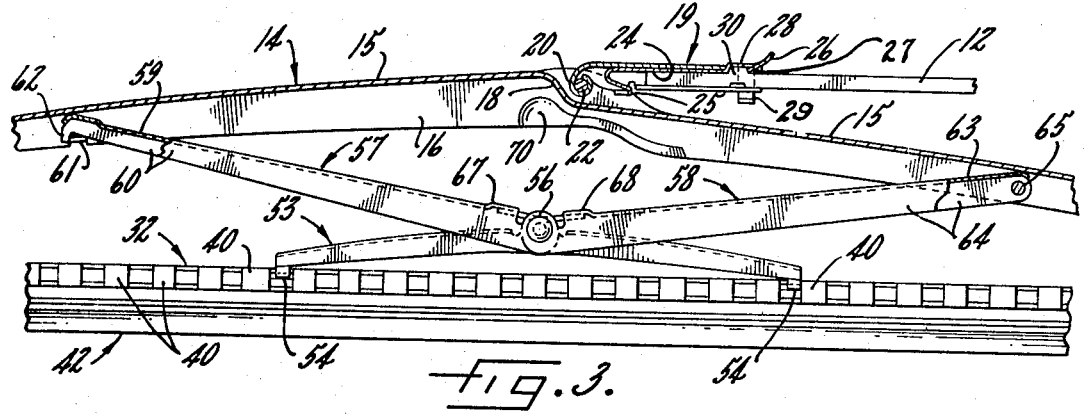
FIG. 3 is an enlarged fragmentary vertical section taken on the line 3—3 of FIG. 2.
Figure 4:
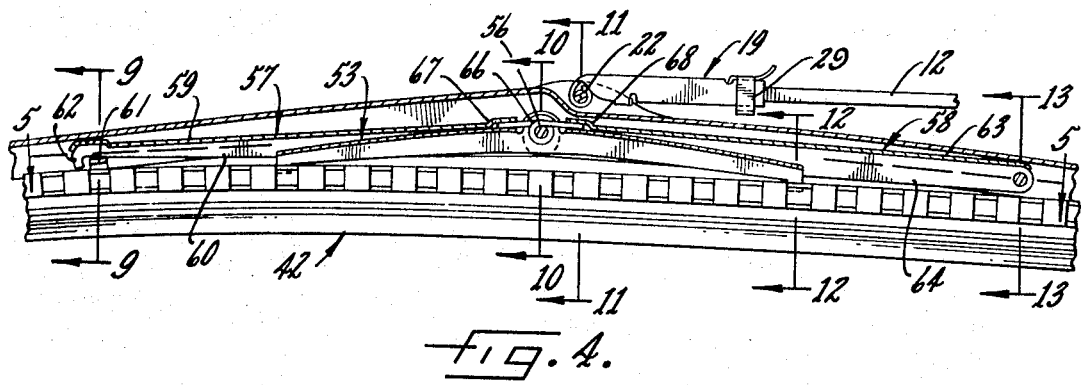
FIG. 4 is an enlarged fragmentary vertical section similar to FIG. 3, but showing the assembly in its retracted nested position.
Figure 5:
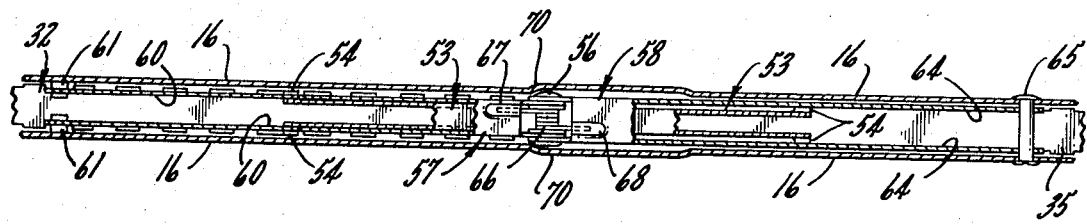
FIG. 5 is a horizontal section taken on the line 5—5 of FIG. 4.

As shown in the drawings, the wiper assembly comprises a rigid generally arcuate bow 14 having a channeled cross-section including a web 15 interconnecting a pair of laterally spaced generally parallel legs 16. The bow has an offset 18 intermediate its ends and a connector 19 is received in an opening formed in the bow web 15 at said offset. Said connector has a generally rectangular cross-section and is provided with a sleeve 20 at its forward end. A pin 22 extends through the bow legs 16 and connector sleeve 20 for swingably mounting the connector on the bow for movement between an extended position in which it projects outwardly from said bow as shown in FIG. 1 and a retracted position in which it lies closely adjacent the bow web 15 as shown in FIG. 4. A hooked leaf spring 24 is carried in the connector 19 against the top thereof along the major portion of its length and has a tang 25 at one of its ends received in an opening in the bottom of the connector. The opposite end of said spring comprises an upwardly bent tab 26 projecting upwardly from the connector with an offset 28 and tang 27 being formed in the spring inwardly from said tab for reception in an opening formed in the top of the connector. A pair of L-shaped fingers 29 extend downwardly from the spring adjacent the offset 28 to engage under the connector side walls to limit the upward movement of the spring and prevent its permanent distortion. As shown in FIG. 3, the end of one type of conventional driving arm 12 has a rectangular cross-section and is provided with a boss 30 at its outer end. The arm is insertable into the connector 19 and spring 24 with its boss 30 received in the spring offset 28 and releasably retained therein by tang 27 for thus releasably interconnecting the arm and wiper assembly.

Figure 8:
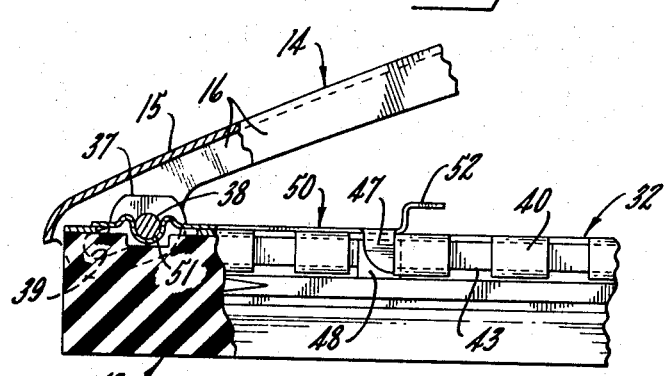
FIG. 8 is an enlarged vertical section taken on the line 8—8 of FIG. 2.
Figure 6:
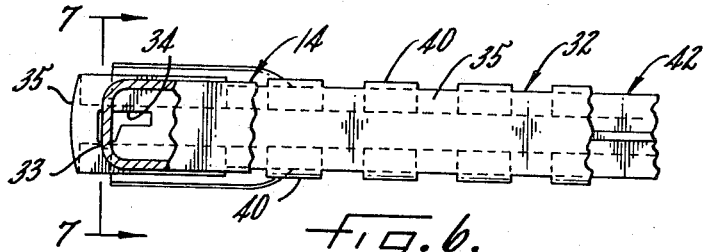
FIG. 6 is an enlarged fragmentary horizontal section taken on the line 6—6 of FIG. 1.
Figure 7:
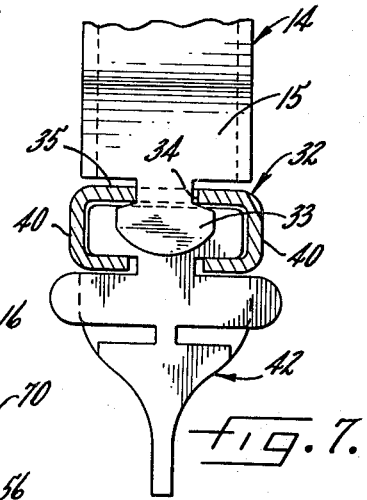
FIG. 7 is a vertical section taken on the line 7—7 of FIG. 6.
Figure 9:
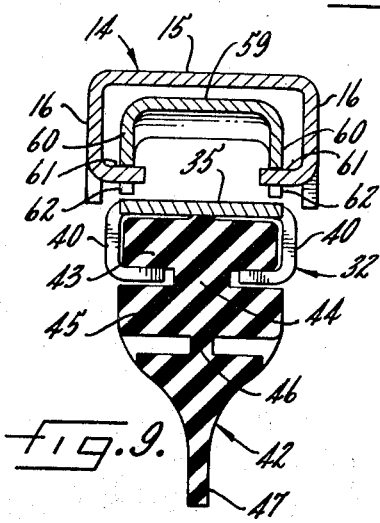
FIG. 9 is an enlarged vertical section taken on the line 9—9 of FIG. 4.
Figure 10:
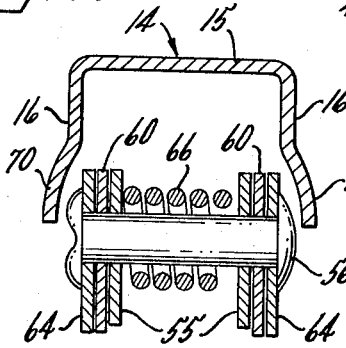
FIG. 10 is an enlarged vertical section taken on the line 10—10 of FIG. 4.
Figure 12:
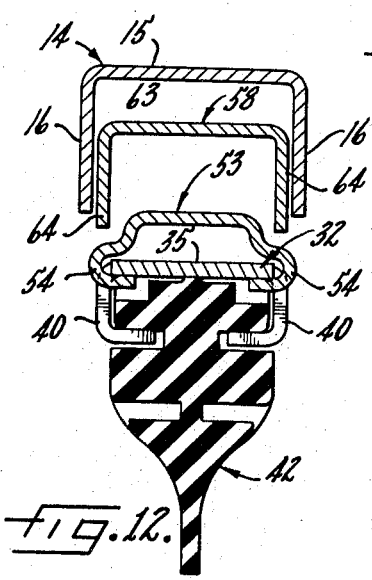
FIG. 12 is an enlarged vertical section taken on the line 12—12 of FIG. 4.
Figure 13:
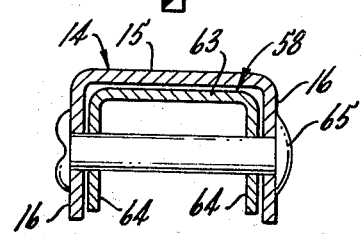
FIG. 13 is an enlarged vertical section taken on the line 13—13 of FIG. 4.
Figure 11:
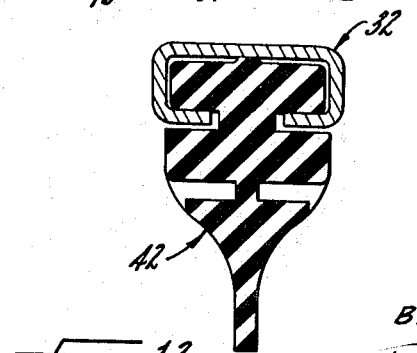
FIG. 11 is an enlarged vertical section taken on the line 11—11 of FIG. 4.

The bow 14 is connected at its ends to the ends of an elongated holder 32 relatively rigid transversely of its width but flexible transversely of its thickness. As shown in FIGS. 6 and 7, one end of the bow web 15 is formed into a foot 33 which is received in an L-shaped opening 34 formed in the adjacent end of the web 35 of the holder for swingably interconnecting one end of the bow and holder together. The bow 14, which has a width greater than the holder 32, has its legs 16 carried against the outer faces of a pair of ears 37 struck upwardly from the opposite end of the holder. A pin 38 is carried in openings formed in the ears 37 and in an elongated slot 39 formed in the web legs 16 whereby the ends of the bow and holder shown in FIG. 8 will be swingably connected on a sliding axis. If desired, the bow and holder can be interconnected at both of their ends on slidable axes.

As shown, the holder 32 has a plurality of longitudinally spaced fingers 40 extending downwardly and inwardly from the longitudinal edges of its web 35 to define with said web an elongated generally rectangularly shaped channel. A squeegee 42 formed from an elastomeric material is mounted in the holder and comprises an upper rectangularly shaped head 43 carried within the holder channel and connected by a web 44 to a generally rectangularly shaped shoulder 45 disposed closely adjacent the lower faces of the fingers 40. The shoulder is connected by a neck 46 of substantially reduced cross-sectional thickness to a generally triangularly shaped wiping body 47 projecting outwardly from the holder to engage the windshield surface 10 so that as the wiper assembly is traversed across the windshield surface 10 by the arm 12, the squeegee 42 will swing back and forth along an axis generally parallel to the longitudinal axis of the assembly. The squeegee head 43 has a slightly smaller cross-sectional extent than the holder channel for ease of assembly.

The squeegee head 43 can be inserted between the holder fingers 40 until a pair of recesses 48 formed in the opposed sides of its head 43 receive a pair of downwardly projecting tongues 47 on a clip 50 lying along the upper face of the holder 32. In this manner, both the clip 50 and the foot 33 retain the squeegee in a longitudinally fixed position in the holder. The clip 50 has an offset 51 received under the pin 38 so that by lifting upwardly on the finger 52 at the inner end of said clip, it will swing upwardly about the pin 38 to remove its tongues 47 from the squeegee recesses 48. To remove the squeegee, as for replacement, it is merely necessary to disengage the clip from the squeegee, whereupon the squeegee can be slid outwardly from the free end of the holder.

As shown in FIG. 3, an arcuate load bar 53 having a channel shaped cross-section is connected to the holder at a pair of longitudinally spaced points intermediate the ends of said holder. Inwardly bent hooks 54 are formed on the ends of the load bar and extend around the edges of the holder web 35 between pairs of adjacent fingers 40 for mounting the load bar on the holder. The longitudinal length of hooks 54 is less than the spacing between adjacent fingers 40 to permit limited relative sliding movement between the load bar and holder. A pair of ears 55 are struck upwardly from the load bar and are swingably connected by a pin 56 to a pair of diverging channeled links 57 and 58 for interconnecting said links to the holder. The link 57 comprises a web 59 interconnecting a pair of legs 60 through which the pin 56 extends. The opposite end of the link legs 60 are received between the bow legs 16 and are slidably and swingably supported on a pair of fingers 61 projecting inwardly from the bow legs 16. Downwardly extending tongues 62 are provided on the link legs 60 and are engageable with the fingers 61 to limit sliding movement of the link 57 with respect to the bow. The link 58 comprises a web 63 interconnecting a pair of legs 64 through which the pin 56 extends. The opposite end of the link legs 64 are also received between the bow legs 16 and are swingably connected thereto by a pin 65, said connection being located intermediate the pin 22 and the tongue 33. As shown, a coil spring 66 is carried on the pin 56 with one of its ends received in an offset 67 formed in the web 59 of link 57 and its opposite end received in an offset 68 formed in the web 63 of link 58. The spring 66 acts against the links 57 and 58 to urge said links in a direction to reduce the angle between them and cause the load bar 53, and thus the squeegee 42, to move outwardly away from the bow 14.

As shown in FIGS. 1 and 3, the thrust from the arm spring 13 and link spring 66 is transmitted to the squeegee through the load bar 53 to cause the holder 32 and squeegee 42 to bend outwardly away from the bow 14. Said load bar and holder will insure that a controlled thrust will be transmitted to the squeegee throughout its length to prevent the squeegee from skip wiping as it is traversed across the windshield. As the squeegee wipes across a convex surface, it will bow inwardly toward the bow with the links 57 and 58 swinging about the axes of the pins 56 and 65 and the fingers 61. As the squeegee is bowed inwardly, the load bar will move into a nested position between the link legs 60 and 64, and the links will move into a nested position between the bow legs 16. To permit said links and load bar to move into their fully nested positions as shown in FIG. 4, the bow legs 16 are bent outwardly, as at 70, to accommodate the pin 56. With the links and load bar in their nested position, the connector 19 can swing about the axis of pin 22 so that it lies closely adjacent the bow web 15 behind the offset 18.

The wiper assembly shown in FIGS. 1–13 is primarily adapted for use with squeegees having lengths longer than 13 inches where for efficient wiping action it is desirable that greater thrust forces be imparted to the squeegee at a plurality of longitudinally spaced points intermediate their lengths. Although the assembly shown in FIGS. 1–13 can be used with shorter squeegees, the wiper assembly shown in FIGS. 14–16 is primarily adapted for use on squeegees 13 inches and shorter, wherein it is not essential that the lesser thrust forces be imparted to the squeegees at a plurality of points intermediate their lengths. Except for differences in their lengths, the squeegee 42' and bow 14' of the wiper assembly shown in FIGS. 14–16 are identical in construction to the squeegee 42 and bow 14 of the wiper assembly shown in FIGS. 1–13. The links 57' and 58' and the connector 19' are also identical in construction to the links 57 and 58 and connector 19, respectively.

Because of its shorter length, the wiper assembly shown in FIGS. 14–16 eliminates the load bar 53. Therefore, the holder 32' is provided with a pair of upturned ears 72 intermediate its length. Except for this difference and the difference in its length, the holders 32 and 32' are identical. The legs 60' and 64' on the links 57' and 58' are swingably connected to the ears 72 by a pin 56' with said legs and ears being disposed in face-to-face contact to prevent any lateral rocking movement between the links and holder. A coil spring 66' is carried on pin 56' with one of its ends received in an offset 67' in the web 59' of link 57' and its opposite end received in an offset 68' formed in the web 63' of link 58' to urge said links in a direction to decrease the angle between them.

The end of the link 57' remote from the pin 56' has its legs 60' swingably and slidably supported on the fingers 61' on the legs 16' of the bow. The end of the link 58' remote from the pin 56' is swingably connected to the bow by a pin 65' extending through the bow and link legs 16' and 64'. Thus, pressure from the arm 12' will be applied to the ends of the holder 32' by the ends of the bow 14', and will be applied to the central portion of said holder by the links 57' and 58'. As the squeegee 42' is moved inwardly toward the bow 14' by the curvature of the surface being wiped, the links 57' and 58' will swing about the axes defined by the fingers 61' and pins 56' and 65' and said links and the holder 32' will move into a retracted nested position lying substantially entirely within the vertical extent of the bow legs 16'. Like the bow 14, the bow 14' has offsets 70' accommodating the pin 56' in its nested position.

In each embodiment of the invention, the legs on the links 57 and 58 or 57' and 58' are in abutting engagement with the adjacent faces of the bow legs 16 or 16'. In a like manner, the legs on links 57 and 58 are in abutting engagement with each other and the ears 55 adjacent the pin 56, and the legs on links 57' and 58' are in abutting engagement with each other and the ears 72 adjacent the pin 56'. In this manner, the holders 32 and 32' are prevented from rocking about their longitudinal axes as the assemblies are traversed across a windshield.

I claim:

1. A windshield wiper assembly, comprising a bow, an elongated flexible holder swingably connected at its ends to said bow, an elongated squeegee mounted in said holder and projecting outwardly therefrom to engage the surface to be wiped, a pair of links pivotally interconnected to each other and to said holder at one of their ends and pivotally interconnected to said bow at their opposite ends, and a connector swingably connected to said bow for connecting said assembly to a wiper driving arm.

2. A windshield wiper assembly, comprising a bow, an elongated flexible holder swingably connected at its ends to said bow, an elongated squeegee mounted in said holder and projecting outwardly therefrom to engage the surface to be wiped, a pair of links pivotally interconnected to each other and to said holder at one of their ends and pivotally interconnected to said bow at their opposite ends to define three longitudinally spaced pivot points, at least one of said pivot points being longitudinally movable, and a connector swingably connected to said bow for connecting said assembly to a wiper driving arm.

3. A windshield wiper assembly, comprising a bow, an elongated flexible holder swingably connected at its ends to said bow, an elongated squeegee mounted in said holder and projecting outwardly therefrom to engage the surface to be wiped, a pair of links pivotally interconnected to each other and to said holder at one of their ends and pivotally interconnected to said bow at their opposite ends to define three longitudinally spaced pivot points, at least one of said pivot points being longitudinally movable, biasing means acting on said links to urge said links to swing about their interconnections to said bow and holder for urging said squeegee to move outwardly relative to said bow, and a connector swingably connected to said bow for connecting said assembly to a wiper driving arm.

4. A windshield wiper assembly, comprising a bow, an elongated flexible holder, an elongated squeegee mounted in said holder and projecting outwardly therefrom, said bow being swingably connected to said holder by a pin at one of its ends and having a foot at its opposite end swingably received in an opening in said holder, said foot projecting below the top of said squeegee outwardly from one end thereof, a clip swingably carried on said holder and releasably engageable with said squeegee adjacent its end remote from said foot, a pair of links pivotally interconnected to each other and to said holder at one of their ends and pivotally interconnected to said bow at their opposite ends, and a connector swingably connected to said bow for connecting said assembly to a wiper driving arm.

5. A windshield wiper assembly as set forth in claim 4 in which said clip is swingable about said pin and is provided with a pair of tongues removably received in recesses formed in the squeegee.

6. A windshield wiper assembly, comprising a rigid arcuate bow, an elongated flexible holder swingably connected at its ends to said bow at a pair of longitudinally spaced points at least one of which is longitudinally movable, an elongated squeegee mounted in said holder and projecting outwardly therefrom to engage the surface to be wiped, a pair of diverging links operatively connected to the holder and swingably connected to said bow at a pair of longitudinally spaced points, the connection of at least one of said links to said bow being longitudinally movable, biasing means for reducing the angle of divergence between said links, and a connector swingably connected to said bow for connecting said assembly to a wiper driving arm.

7. A windshield wiper assembly, comprising a bow, an elongated flexible holder swingably connected at its ends to said bow, an elongated squeegee mounted in said holder and projecting outwardly therefrom to engage the surface to be wiped, a pair of links pivotally connected to said bow at one of their ends intermediate the ends of said bow and pivotally connected to each other at their opposite ends, a load bar connected to said holder at a pair of longitudinally spaced points intermediate the ends thereof and pivotally interconnected to said opposite ends of said links, and a connector swingably connected to said bow for connecting said assembly to a wiper driving arm.

8. A windshield wiper assembly as set forth in claim 7 in which said load bar is slidably connected to said holder.

9. A windshield wiper assembly, comprising a bow, an elongated flexible holder swingably connected to said bow at a pair of longitudinally spaced points at least one of which is longitudinally movable, an elongated squeegee mounted in said holder and projecting outwardly therefrom to engage the surface to be wiped, a pair of links pivotally interconnected to each other and to said holder at one of their ends and pivotally interconnected at a pair of longitudinally spaced points to said bow at their opposite ends to define three pivot points at least one of which is longitudinally movable, biasing means acting on said links to urge said squeegee outwardly from said bow, and a connector swingably connected to said bow for connecting said assembly to a wiper driving arm.

10. A windshield wiper assembly as set forth in claim 9 in which said bow has a generally arcuate configuration with a channeled cross-section, and said holder and links have widths throughout the major portion of their lengths less than the width of said bow whereby said holder and links can be nested within the bow.

11. A windshield wiper assembly as set forth in claim 10 with the addition that said bow has an offset intermediate its length and said connector is swingably connected to said bow at said offset for movement between a retracted position in which it rests immediately adjacent said bow and an extended position in which it is swung outwardly from said bow.

12. A windshield wiper assembly, comprising an arcuate bow, an elongated flexible holder swingably connected adjacent its opposite ends to said bow, an elongated squeegee mounted in said holder and projecting outwardly therefrom to engage the surface to be wiped, a first link swingably connected to said bow on a longitudinally movable first axis, a second link swingably connected to said bow on a second axis spaced from said first axis, a pin swingably connecting said first and second links to each other and to said holder on a third axis longitudinally interposed between said first and second axes, a spring carried on said pin and bearing against said first and second links to urge said squeegee outwardly from said bow, and a connector swingably connected to said bow on an axis intermediate said first and second axes for connecting said assembly to a wiper driving arm.

13. A windshield wiper assembly, comprising an arcuate bow, an elongated flexible holder swingably connected adjacent its opposite ends to said bow, an elongated squeegee mounted in said holder and projecting outwardly therefrom to engage the surface to be wiped, a load bar connected to said holder at a pair of points intermediate the ends thereof, a first link swingably connected to said bow on a longitudinally movable first axis, a second link swingably connected to said bow on a second axis spaced from said first axis, a pin swingably connecting said first and second links to each other and to said load bar intermediate the ends thereof on a third axis longitudinally interposed between said first and second axis, a spring carried on said pin and bearing against said first and second links to urge said squeegee outwardly from said bow, and a connector swingably connected to said bow on an axis intermediate said first and second axes for connecting said assembly to a wiper driving arm.

14. A windshield wiper assembly as set forth in claim 13 in which said load bar has a generally arcuate configuration with a channeled cross-section and is slidably connected to said holder.

15. A windshield wiper assembly, comprising an arcuate bow, an elongated flexible holder swingably connected adjacent its opposite ends to said bow, an elongated squeegee mounted in said holder and projecting outwardly therefrom to engage the surface to be wiped, a pair of links swingably connected at one of their ends to said bow at a pair of longitudinally spaced points at least one of which is longitudinally movable, the opposite ends of said links being swingably connected to each other and to said holder at a point intermediate its connection to said bow, biasing means acting on said links to urge said links to swing about their connections to said bow and holder for urging said squeegee to move outwardly with respect to said bow, and a connector swingably connected to said bow for connecting said assembly to a wiper driving arm.

16. A windshield wiper assembly as set forth in claim 15 in which said bow has a channeled cross-section, and said holder and links have widths through the major portion of their lengths less than the width of said bow whereby said holder and links can be nested within the bow.

No references cited.

CHARLES A. WILLMUTH, *Primary Examiner.*